(12) United States Patent
Lee

(10) Patent No.: US 11,175,114 B1
(45) Date of Patent: Nov. 16, 2021

(54) FIREARM GRIP WITH CABLE ORGANIZER

(71) Applicant: Shanyao Lee, Santa Ana, CA (US)

(72) Inventor: Shanyao Lee, Santa Ana, CA (US)

( * ) Notice: Subject to any disclaimer, the term of this patent is extended or adjusted under 35 U.S.C. 154(b) by 0 days.

(21) Appl. No.: 16/914,425

(22) Filed: Jun. 28, 2020

(51) Int. Cl.
*F41C 23/22* (2006.01)
*F41C 23/16* (2006.01)
*F16L 3/02* (2006.01)

(52) U.S. Cl.
CPC ............... *F41C 23/22* (2013.01); *F16L 3/02* (2013.01); *F41C 23/16* (2013.01)

(58) Field of Classification Search
CPC ........... F41C 23/16; F41C 23/22; F41C 27/00
See application file for complete search history.

(56) References Cited

U.S. PATENT DOCUMENTS

| | | | | |
|---|---|---|---|---|
| 5,208,826 A * | 5/1993 | Kelly | ........................ | F41G 1/35 248/176.1 |
| 5,706,600 A * | 1/1998 | Toole | ........................ | F41G 1/35 362/114 |
| 7,243,454 B1 * | 7/2007 | Cahill | ..................... | F41C 23/12 42/72 |
| 7,676,975 B2 * | 3/2010 | Phillips | ................... | F41C 23/14 42/72 |
| 7,845,105 B1 * | 12/2010 | Cahill | ..................... | F41C 27/00 42/72 |
| 8,109,032 B2 * | 2/2012 | Faifer | .................. | G03B 17/563 42/146 |
| 8,225,544 B2 * | 7/2012 | Darian | .................. | F41G 11/003 42/90 |
| 8,316,574 B1 * | 11/2012 | Swan | ....................... | F41C 27/00 42/146 |
| 8,635,798 B2 * | 1/2014 | Mulfinger | ............... | F41A 11/04 42/84 |
| 8,850,735 B2 * | 10/2014 | Kenney | ................. | F41G 11/003 42/72 |
| 8,875,434 B2 * | 11/2014 | Michal | .................... | F41C 27/00 42/96 |
| 9,291,424 B2 * | 3/2016 | Tagarro | ...................... | F41J 5/10 |
| 9,488,436 B2 * | 11/2016 | Abst | ..................... | F41G 11/003 |
| 9,488,437 B1 * | 11/2016 | Schnog | ....................... | F41J 5/10 |
| 9,829,274 B2 * | 11/2017 | Vallo | ....................... | F41C 23/22 |
| 9,891,023 B2 * | 2/2018 | Compton | ................ | H02J 50/12 |
| 10,082,363 B2 * | 9/2018 | Burgess | ................ | F41G 11/003 |
| D837,330 S * | 1/2019 | Ding | ........................... | D22/108 |
| 10,514,235 B1 * | 12/2019 | McCauley | ............... | H01H 9/02 |
| D877,842 S * | 3/2020 | Yu | .................................. | D22/108 |
| 10,641,583 B2 * | 5/2020 | Zimmer | ................ | F41G 11/003 |
| 2009/0140015 A1 * | 6/2009 | Faifer | ................... | F41G 11/003 224/191 |

(Continued)

*Primary Examiner* — Derrick R Morgan
(74) *Attorney, Agent, or Firm* — Che-Yang Chen; Law Office of Michael Chen

(57) ABSTRACT

In one aspect, a firearm grip may include an elongated grip body that includes a front side, a rear side, opposing sides and a cable organizing member. The cable organizing member may include one or more elongated cable securing grooves, and the cable can be received in the cable securing groove by simply being pressed therein instead of dangling around. The organizing member may further include a cable receiving slot at a predetermined location on each of the cable securing grooves, and the cable can be slightly deformed and inserted into the cable receiving slot so the cable can be further secured on the cable organizing member.

7 Claims, 8 Drawing Sheets

(56) References Cited

U.S. PATENT DOCUMENTS

| | | | |
|---|---|---|---|
| 2009/0288323 A1* | 11/2009 | Moody | F41A 23/08 |
| | | | 42/72 |
| 2013/0055614 A1* | 3/2013 | Finnegan | F41C 27/00 |
| | | | 42/90 |
| 2014/0115936 A1* | 5/2014 | Kenney | F41A 3/66 |
| | | | 42/16 |

* cited by examiner

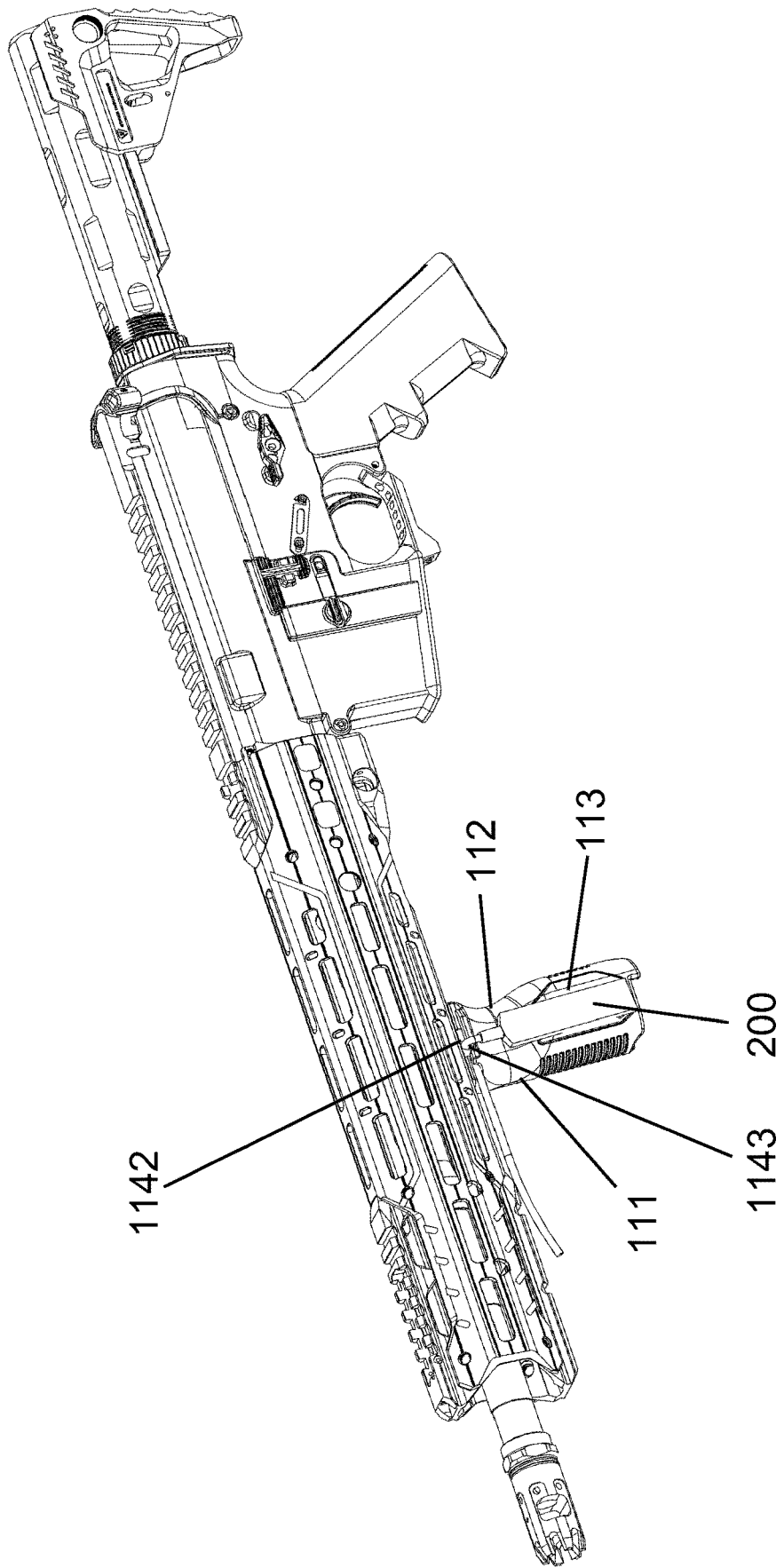

FIREARM GRIP WITH CABLE ORGANIZER

FIELD OF THE INVENTION

The present invention relates to a firearm grip, and more particularly relates to a firearm grip that can be used to organize or retain cables of firearm accessories.

BACKGROUND OF THE INVENTION

Users of weapons have often found it convenient to attach accessories of various types to their weapons, particularly firearms. Such accessories include laser sighting devices, flash lights (both navigation lights and tactical lights), pressure switches, and radio frequency (RF) transmitters and/or receivers. However, attaching multiple accessories can undesirably affect the size and weight of the firearm, cause excessive power consumption, and render the firearm inefficient to operate and maintain. And when the firearm is operated, the cable(s) of the accessories, if not well-organized, can be bothersome and inconvenient for the firearm users.

U.S. Pat. Nos. 7,243,454 and 7,464,495 to Cahill. disclose vertical fore grip for a firearm with an integrated pressure switch pocket. The vertical fore grip includes a body with internal storage cavity, a mount adapted to secure a firearm, a pocket for a pressure switch on the perimeter of the body, and a cap to secure a pressure switch and waterproof the internal storage cavity. The mount has a groove for a firearm rail, at least one locking bar, and a spring for engaging the locking bar to a firearm rail.

However, none of the firearm grips discussed above focuses on how to organize the cables of the firearm accessories when shooting so the cables will not dangle around to affect the users. Therefore, there remains a need for a new and improved firearm grip to better organize the cables of the firearm accessories to further improve the shooting performance.

SUMMARY OF THE INVENTION

In one aspect, a firearm grip may include an elongated grip body that includes a front side, a rear side, opposing sides, and a cable organizing member. In one embodiment, the firearm grip is preferably constructed from a lightweight, durable polymer that can withstand the rigors of combat and normal use. Alternatively, the firearm grip can also be constructed from various metals, composites, natural materials (such as wood and ivory), and/or a combination thereof.

The grip body is preferably angled and contoured to conform to the natural grip and position of a user's hand. Alternatively, the angle of the firearm grip can be fixed or adjustable to allow the user to fire from non-standard positions, which includes such orientations as from a vertical grip, a grip with a forward sweep, a curved grip, or a grip that is canted to the left or right.

In a further embodiment, the cable organizing member may include one or more elongated cable securing grooves, and the cable can be received in the cable securing groove by simply being pressed therein instead of dangling around.

In an exemplary embodiment, the organizing member further includes a cable receiving slot at a predetermined location on the cable securing groove. Likewise, if there is more than one cable securing groove, another cable receiving slot can be formed on the cable securing groove on the other side.

The organizing member may further include one or more side cuts on each side of the outer sidewall of the cable securing groove. In still a further embodiment, a pressure switch may have a cable and a switch main body, and a portion of the cable can be received in the receiving slot and another portion of the cable can be pulled out from the side cut, so that the switch main body can be hung close to one of the opposing sides, to enable the user to easily operate the pressure switch when holding the firearm grip.

It is noted that the cable can be secured on the cable securing groove but it may still be pulled out from the groove by the user's inadvertent movement or when the firearm is being used in a more dynamic manner. Thus, the cable can be slightly deformed and inserted into the cable receiving slot to further secure the cable on the cable organizing member. When the cable is received by the cable receiving slot, it cannot be easily pulled out and the cable can be organized on or near the firearm grip without dangling around.

When in use, if the firearm is positioned in a static manner, the cable can be simply secured on one of the securing grooves. However, when the firearm is used in a more dynamic manner, the user can further insert the cable into the receiving slot to prevent it from being falling out from the securing groove. The cable receiving slot can also store an excess length of cable to prevent cable tangling.

As stated above, the cable(s) of the firearm accessories may be dangling around to cause some inconvenience to the user. The present invention is advantageous because according to the user's preferences or situations, the cable can be either secured on the securing grooves or further received into the cable receiving slots to hold the cable(s) in a predetermined position without dangling around.

BRIEF DESCRIPTION OF THE DRAWINGS

FIGS. 6 and 6a illustrate schematic views of the pressure switch is secured when being inserted into the receiving slot of the cable organizing member of the firearm grip in the present invention.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
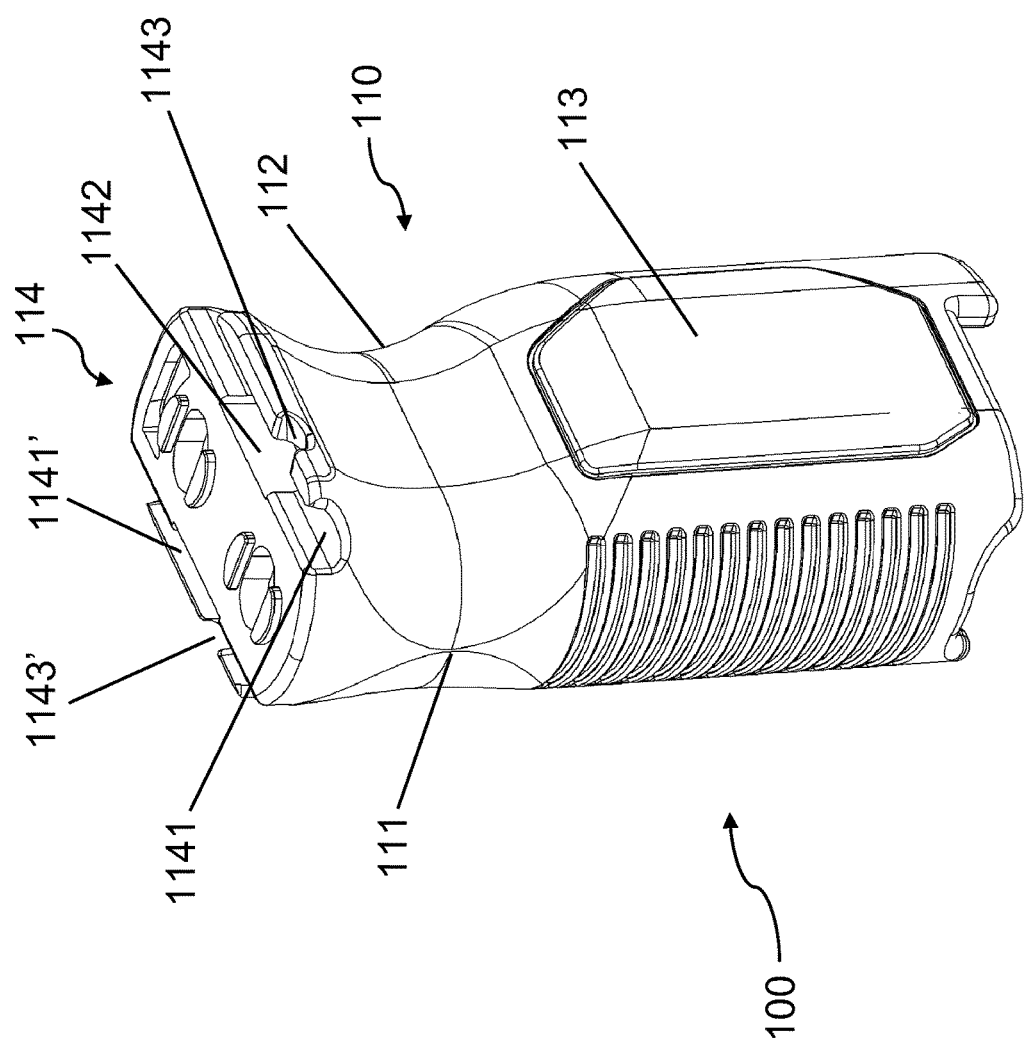
FIG. 1 is a schematic view of the firearm grip that can be used to organize the cables of firearm accessories in the present invention.
Figure 2:
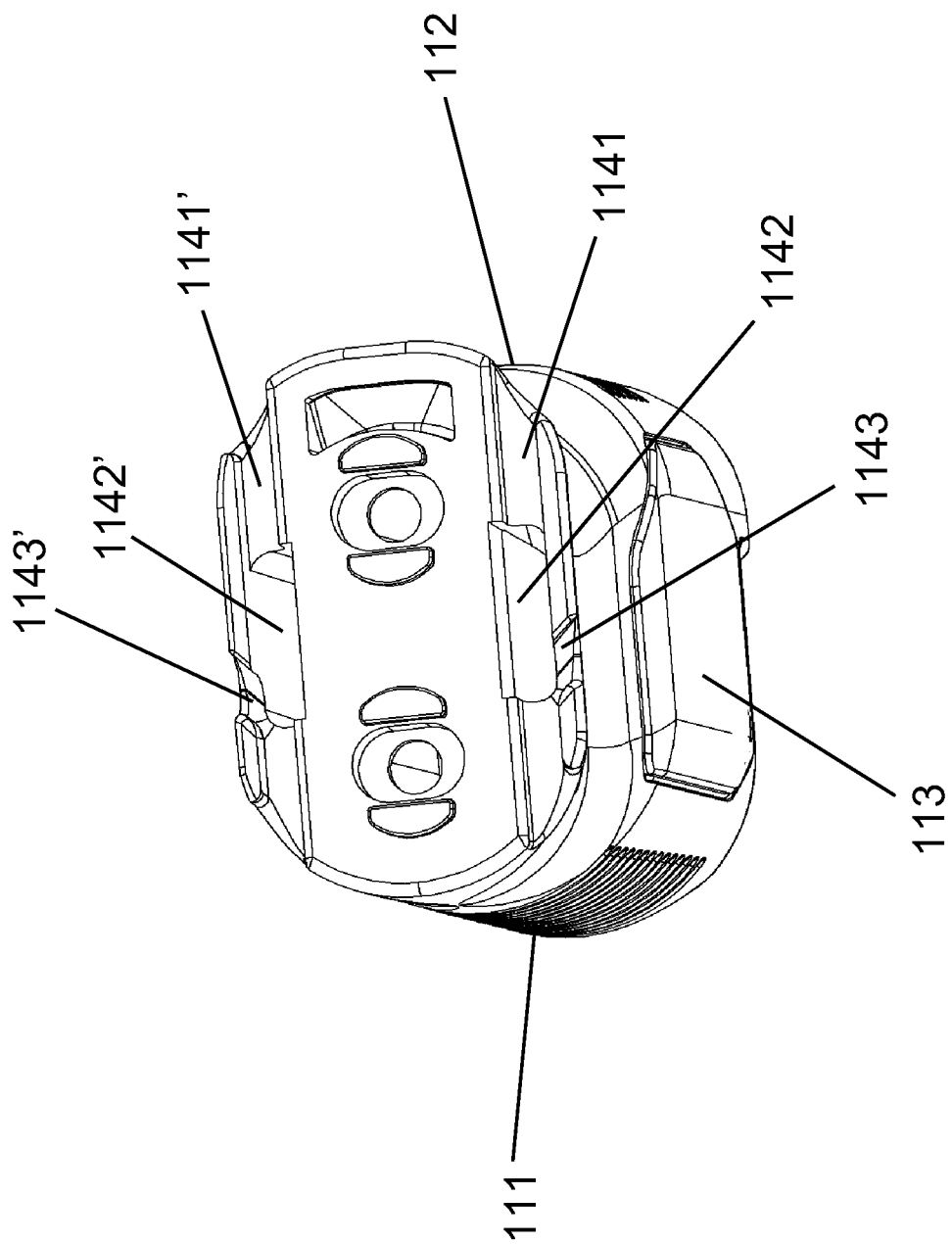
FIG. 2 is a schematic view of the cable organizing member of the firearm grip in the present invention.

In one aspect, referring to FIGS. 1 and 2, a firearm grip 100 may include an elongated grip body 110 that includes a front side 111, a rear side 112, opposing sides 113, and a cable organizing member 114. In one embodiment, the firearm grip 100 is preferably constructed from a lightweight, durable polymer that can withstand the rigors of combat and normal use. Alternatively, the firearm grip 100 can also be constructed from various metals, composites, natural materials (such as wood and ivory), and/or a combination thereof.

The grip body 110 is preferably angled and contoured to conform to the natural grip and position of a user's hand. Alternatively, the angle of the firearm grip 100 can be fixed or adjustable to allow the user to fire from non-standard positions, which includes such orientations as from a vertical grip, a grip with a forward sweep, a curved grip, or a grip that is canted to the left or right.

Figure 3:
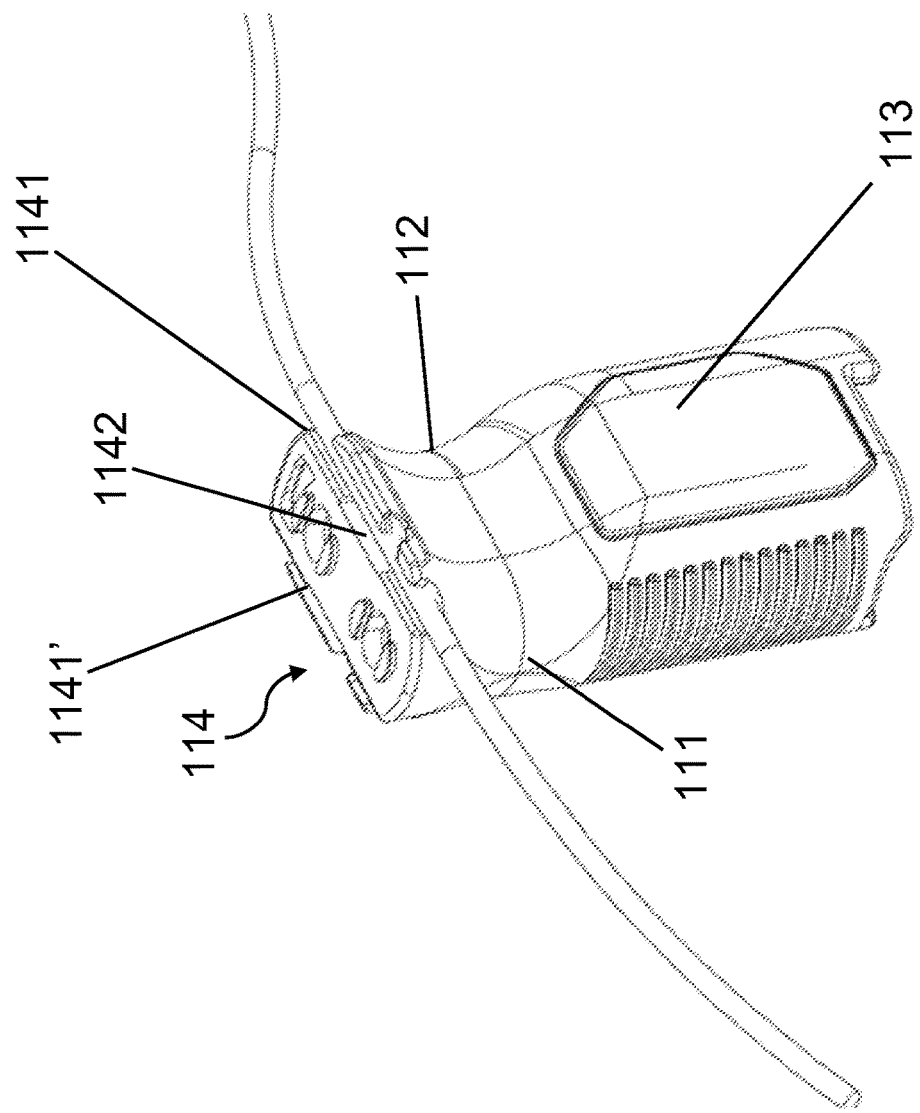
FIG. 3 is a schematic view of a cable secured in the securing groove in the present invention.
Figure 4:
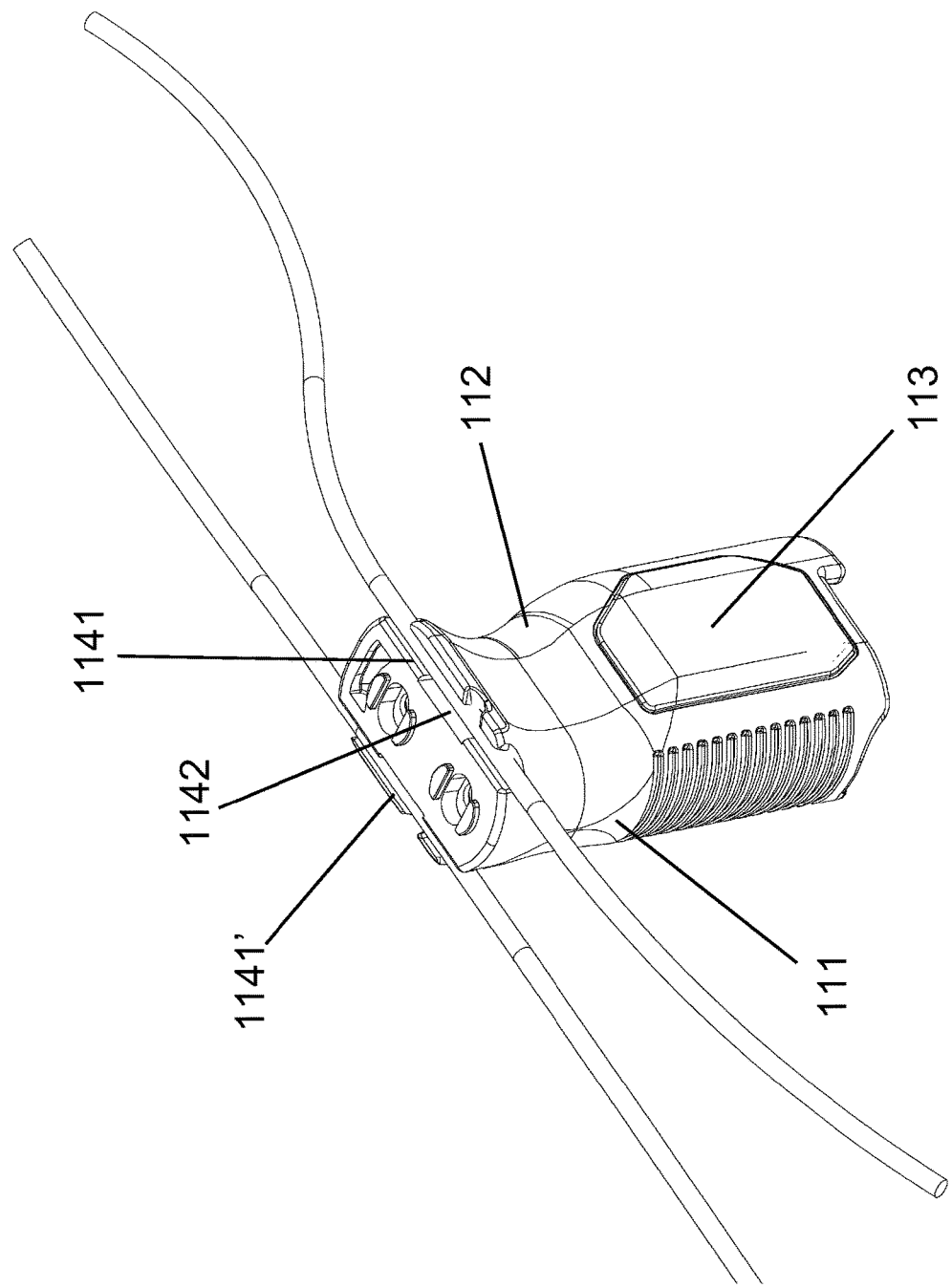
FIG. 4 is a schematic view of two cables secured in the securing grooves in the present invention.

In a further embodiment, as shown in FIGS. 3 and 4, the cable organizing member 114 may include one or more elongated cable securing grooves 1141 and 1141', and the cable can be received in the cable securing groove 1141 (or 1141') by simply being pressed therein instead of dangling around.

Figure 5:
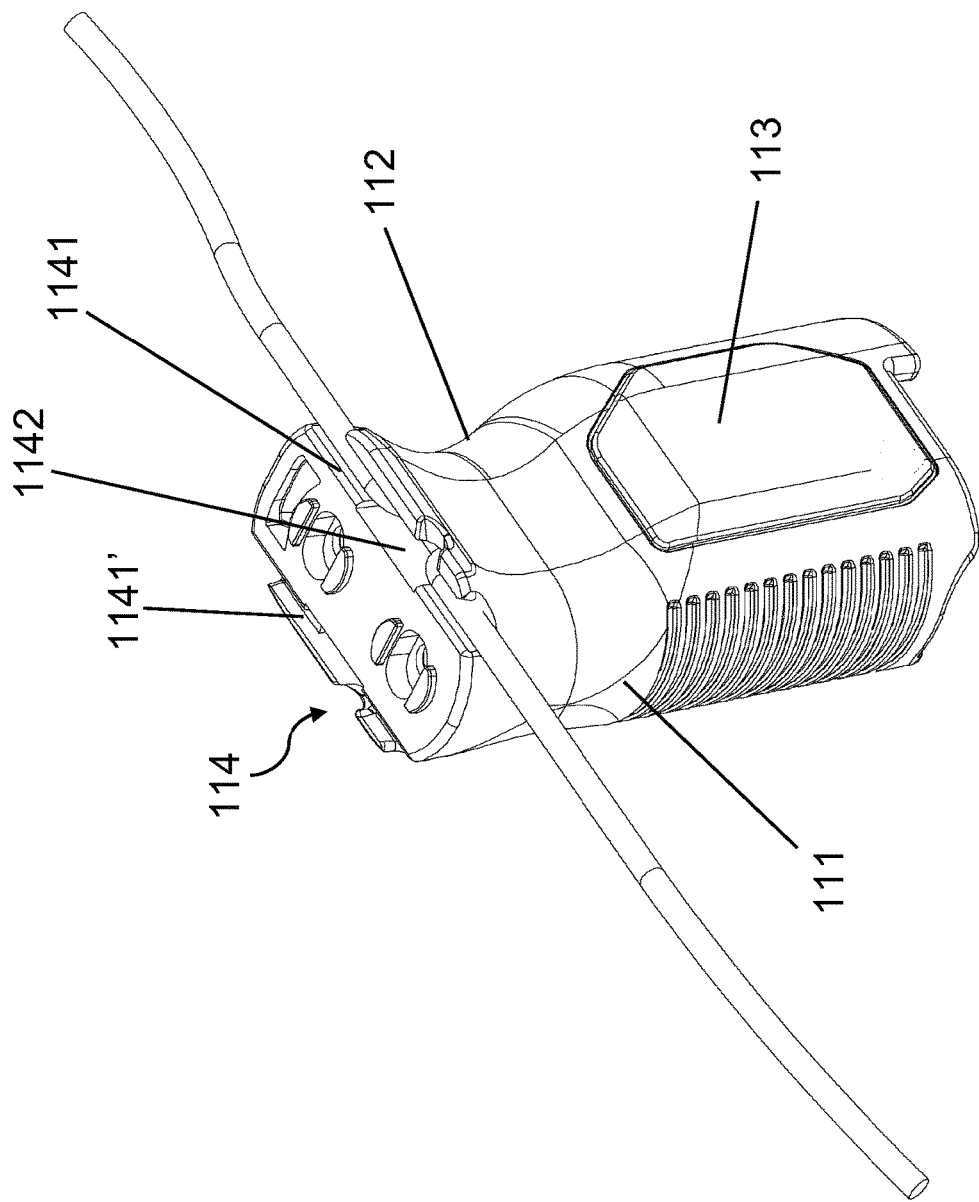
FIGS. 5 and 5a illustrate schematic views of the cable is further secured when being inserted into the receiving slot of the cable organizing member of the firearm grip in the present invention.
Figure 5A:
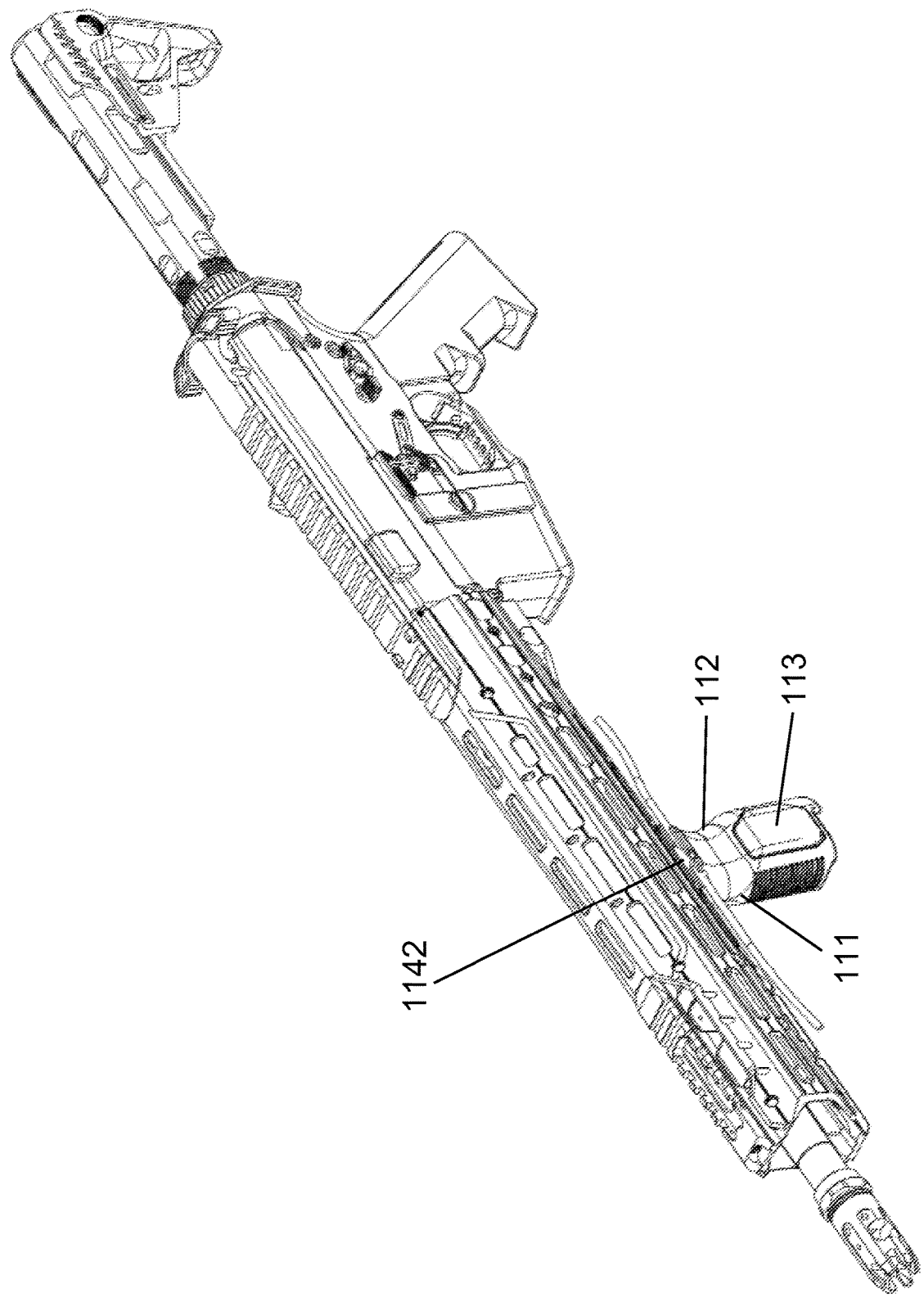

In an exemplary embodiment, the organizing member 114 further includes a cable receiving slot 1142 at a predetermined location on the cable securing groove 1141. Likewise, if there is more than one cable securing groove, another cable receiving slot 1142' can be formed on the cable securing groove 1141' on the other side as shown in FIGS. 5 and 5*b*.

Figure 6:
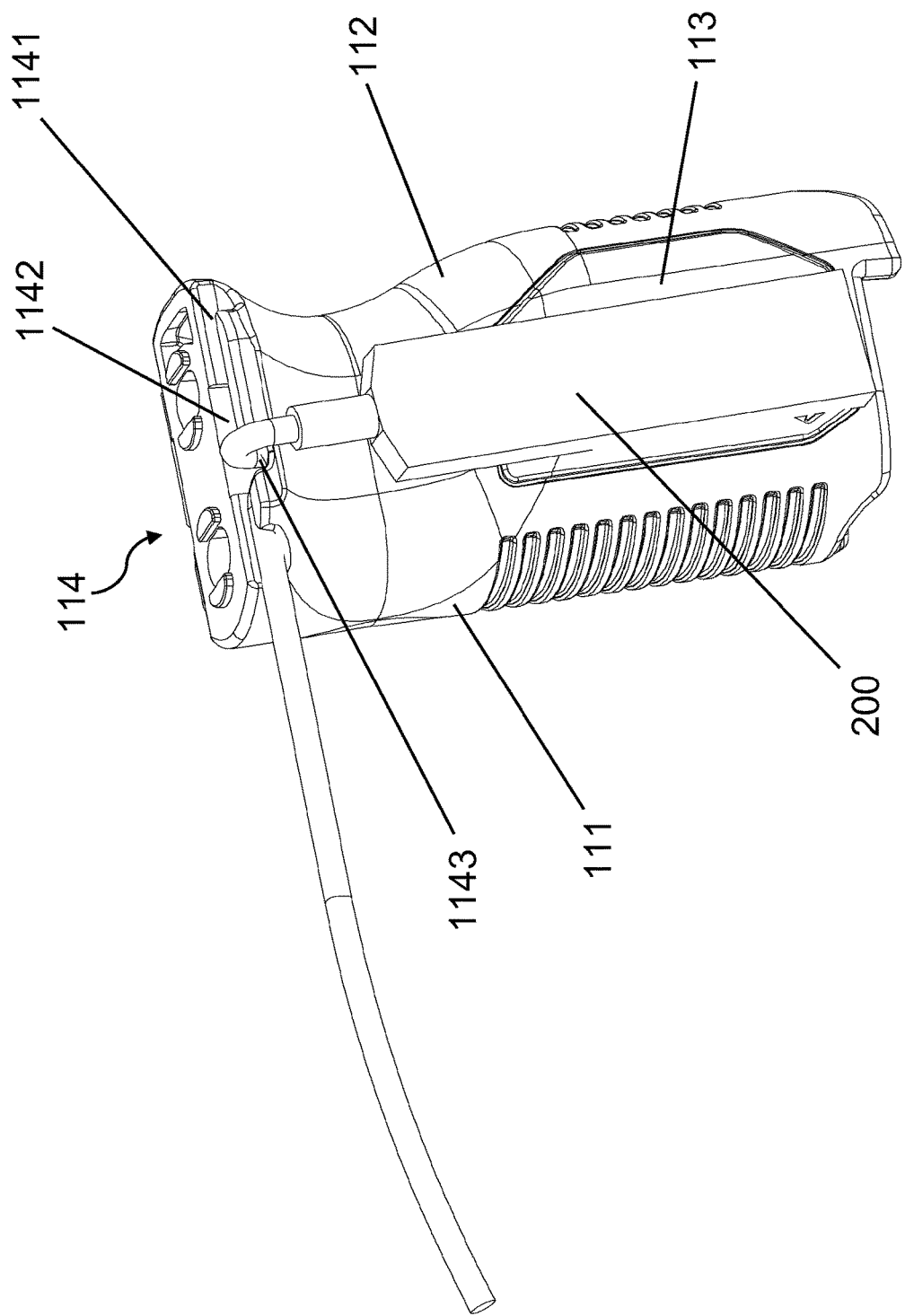

As shown in FIGS. 1 and 2, the organizing member 114 may further include a side cut (1143, 1143') on each side of an outer sidewall of the cable securing groove (1141, 1141'). In still a further embodiment, a pressure switch may have a cable and a switch main body, and a portion of the cable can be received in the receiving slot 1142 and another portion of the cable can be pulled out from the side cut 1143, so that the switch main body can be hung close to one of the opposing sides 113, as shown in FIGS. 6 and 6*a* to enable the user to easily operate the pressure switch when holding the firearm grip.

It is noted that the cable can be secured on the cable securing groove 1141 (or 1141') but it may still be pulled out from the groove by the user's inadvertent movement. Thus, the cable can be slightly deformed and inserted into the cable receiving slot 1142 (or 1142') to further secure the cable on the cable organizing member 114. When the cable is received by the cable receiving slot 1142 (or 1142'), it cannot be easily pulled out and the cable can be organized on or near the firearm grip without dangling around.

When in use, if the firearm is positioned in a static manner, the cable can be simply secured on one of the securing grooves 1141 or 1141'. However, when the firearm is used in a more dynamic manner, the user can further insert the cable into the receiving slot 1142 or 1142' to prevent it from being falling out from the securing groove 1141 or 1141'. The cable receiving slot can also store an excess length of cable to prevent cable tangling.

As stated above, the cable(s) of the firearm accessories may be dangling around to cause some inconvenience to the user. The present invention is advantageous because according to the user's preferences or situations, the cable can be either secured on the securing grooves (1141, 1141') or further received into the cable receiving slots (1142, 1142') to hold the cable(s) in a predetermined position without dangling around.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A firearm grip comprising an elongated grip body that includes a front side, a rear side, opposing sides and a cable organizing member; said cable organizing member including at least one cable securing groove and at least one cable receiving slot formed at a predetermined position on the cable securing groove to secure a cable either in the securing groove or inside the securing slot; and wherein the cable receiving slot is configured to store an excess length of the cable to prevent cable tangling.

2. The firearm grip of claim 1, wherein the cable can be secured in the securing groove when being pressed therein.

3. The firearm grip of claim 1, wherein the cable can be slightly deformed and inserted into the securing slot to be further secured therein.

4. The firearm grip of claim 1, further comprising one or more side cuts located on an outer sidewall of the cable securing groove, so a portion of the cable can be pulled out from the side cut along with a firearm accessory for the user to operate while holding the firearm grip.

5. The firearm grip of claim 4, wherein the firearm accessory is a pressure switch.

6. The firearm grip of claim 1, wherein the firearm grip preferably constructed from a lightweight, durable polymer that can withstand the rigors of combat and normal use.

7. The firearm grip of claim 1, wherein the firearm grip is constructed from various metals, composites, natural materials including wood and ivory, and/or a combination thereof.

\* \* \* \* \*